United States Patent
Aida et al.

(10) Patent No.: US 9,725,542 B2
(45) Date of Patent: Aug. 8, 2017

(54) PROCESS FOR PRODUCING FLUORINATED POLYMER

(71) Applicant: ASAHI GLASS COMPANY, LIMITED, Chiyoda-ku (JP)

(72) Inventors: Shigeru Aida, Chiyoda-ku (JP); Daisuke Taguchi, Chiyoda-ku (JP)

(73) Assignee: Asahi Glass Company, Limited, Chiyoda-ku (JP)

(*) Notice: Subject to any disclaimer, the term of this patent is extended or adjusted under 35 U.S.C. 154(b) by 0 days.

(21) Appl. No.: 15/350,809

(22) Filed: Nov. 14, 2016

(65) Prior Publication Data

US 2017/0058065 A1 Mar. 2, 2017

Related U.S. Application Data

(63) Continuation of application No. PCT/JP2015/065399, filed on May 28, 2015.

(30) Foreign Application Priority Data

May 30, 2014 (JP) ................. 2014-112770

(51) Int. Cl.
| | |
|---|---|
| C08F 214/26 | (2006.01) |
| C08F 214/18 | (2006.01) |
| C08F 2/06 | (2006.01) |
| C08F 214/28 | (2006.01) |
| C08F 222/02 | (2006.01) |

(52) U.S. Cl.
CPC .......... *C08F 214/26* (2013.01); *C08F 2/06* (2013.01); *C08F 214/18* (2013.01); *C08F 214/184* (2013.01); *C08F 214/28* (2013.01); *C08F 222/02* (2013.01)

(58) Field of Classification Search
CPC ....... C08F 2/06; C08F 214/186; C08F 220/08
USPC .................. 526/79, 87, 209, 255
See application file for complete search history.

(56) References Cited

U.S. PATENT DOCUMENTS

| 5,182,342 A | 1/1993 | Feiring et al. |
|---|---|---|
| 6,107,393 A | 8/2000 | Abusleme et al. |
| 7,112,640 B2 * | 9/2006 | Funaki ............ B32B 27/08 430/270.1 |
| 2008/0102285 A1 | 5/2008 | Aida et al. |
| 2010/0126934 A1 | 5/2010 | Nakazato et al. |

FOREIGN PATENT DOCUMENTS

| JP | 7-504224 | 5/1995 |
|---|---|---|
| JP | 8-337620 | 12/1996 |
| JP | 10-265525 | 10/1998 |
| JP | 2004-236405 | 8/2004 |
| JP | 2005-29704 | 2/2005 |
| JP | 2006-152234 | 6/2006 |
| JP | WO2006/134764 | 12/2006 |
| JP | 2008-208046 | 9/2008 |
| JP | 2010-150476 | 7/2010 |
| JP | 2011-32363 | 2/2011 |
| JP | 2012-241128 | 12/2012 |
| WO | WO 2006/134764 A1 | 12/2006 |

OTHER PUBLICATIONS

Machine translation of Detailed Description of JP 2012-241128A; publication date: Dec. 2012.*
International Search Report issued Aug. 4, 2015 in PCT/JP2015/065399, filed on May 28, 2015.

* cited by examiner

*Primary Examiner* — Fred M Teskin

(74) *Attorney, Agent, or Firm* — Oblon, McClelland, Maier & Neustadt, L.L.P.

(57) ABSTRACT

Provided is an effective process for producing a fluorinated polymer excellent in adhesion, by using a polymerization medium having a low ozone layer destruction potential. The process includes polymerizing a monomer mixture comprising a fluorinated monomer and a polar functional group containing monomer (excluding one having a fluorine atom) in a polymerization medium that contains a medium compound represented by $C_mH_{2m+1-x}F_x$—O—$C_nH_{2n+1-y}F_y$, m is an integer of from 1 to 6, n is an integer of from 1 to 6, x is from 0 to (2m+1), y is from 0 to 2n, and (x+y) is at least 1), and wherein a solution obtained by dissolving the polar functional group-containing monomer in the polymerization medium is continuously or intermittently added to a polymerization reaction system.

10 Claims, No Drawings

PROCESS FOR PRODUCING FLUORINATED POLYMER

TECHNICAL FIELD

The present invention relates to a process for producing a fluorinated polymer.

BACKGROUND ART

A fluorinated polymer is excellent in e.g. heat resistance, chemical resistance, weather resistance and non-tackiness, but has difficulty in adhering to other materials so as to form a laminate or a composite material. Therefore, techniques have been developed, wherein a polar functional group is introduced to a fluorinated polymer so as to impart adhesion to other materials (e.g. Patent Documents 1 to 3).

In production of a fluorinated polymer having a polar functional group, a hydrochlorofluorocarbon such as 1,3-dichloro-1,1,2,2,3-pentafluoropropane, has been heretofore used as a chain transfer agent which also functions as a polymerization medium. Nevertheless, a hydrochlorofluorocarbon is an ozone layer-depleting substance, and therefore it has been desired to use a chlorine-free fluorinated polymerization medium.

However, since a polar functional group-containing monomer is usually less soluble in a chlorine-free fluorinated polymerization medium, it is difficult to convert a solid-form polar functional group-containing monomer into a solution form when supplied to a polymerization vessel. If the solid-form polar functional group-containing monomer is supplied to a polymerization vessel as it is, the polar functional group-containing monomer may be hardly taken into a fluorinated polymer due to dispersion failure in the polymerization vessel, and therefore the adhesion of a fluorinated polymer obtained tends to be low.

Further, in recent years, a polymerization medium to be used for producing a fluorinated polymer is often recycled, with a view to protecting environment and reducing the cost of raw materials.

However, as disclosed in Patent Document 3, if a polar functional group-containing monomer is dissolved in a chain transfer agent which is then continuously charged to a polymerization system, the concentration of the chain transfer agent becomes high in a mixed fluid containing a polymerization medium and the chain transfer agent, recovered after polymerization. Therefore, in the case of recycling the mixed fluid containing the polymerization medium and the chain transfer agent, recovered after polymerization, it is necessary to once separate the polymerization medium and the chain transfer agent, and then to readjust the chain transfer agent so as to be a predetermined amount or to newly add a polymerization medium so as to lower the concentration of the chain transfer agent, whereby production efficiency tends to deteriorate.

PRIOR ART DOCUMENTS

Patent Documents

Patent Document 1: JP-A-2004-238405
Patent Document 2: JP-A-2006-152234
Patent Document 3: WO2006/134764

DISCLOSURE OF INVENTION

Technical Problem

It is an object of the present invention to provide a process for efficiently producing a fluorinated polymer excellent in adhesion, by using a polymerization medium having a low ozone layer depletion potential.

Solution to Problem

The present inventors have conducted extensive studies, and as a result, have found that the above problems can be solved by using a polymerization medium containing a specific medium compound for polymerization reaction and continuously or intermittently adding a solution obtained by dissolving a polar functional group-containing monomer in the polymerization medium to a polymerization reaction system.

That is, the present invention provides the following constructions <1> to <8>.

<1> A process for producing a fluorinated polymer, which comprises polymerizing a monomer mixture comprising a fluorinated monomer and a polar functional group-containing monomer (excluding one having a fluorine tom) in a polymerization medium,
wherein the polymerization medium contains a medium compound represented by the following formula (1), and
wherein a solution obtained by dissolving the polar functional group-containing monomer in the polymerization medium is continuously or intermittently added to a polymerization reaction system:

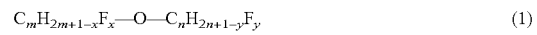

$$C_mH_{2m+1-x}F_x\text{—O—}C_nH_{2n+1-y}F_y \qquad (1)$$

wherein m is an integer of from 1 to 6, n is an integer of from 1 to 6, x is from 0 to (2m+1), y is from 0 to 2n, and (x+y) is at least 1.

<2> The process for producing a fluorinated polymer according to the above <1>, wherein the concentration of the medium compound in the polymerization medium is at least 50 vol %.

<3> The process for producing a fluorinated polymer according to the above <1> or <2>, wherein the solubility of the polar functional group-containing monomer in the polymerization medium at 25° C. is at least 1 mass %.

<4> The process for producing a fluorinated polymer according to the above <1> or <2>, wherein the concentration of the polar functional group-containing monomer in the solution is from 1.3 to 5.0 mass % when the solution obtained by dissolving the polar functional group-containing monomer in the polymerization medium is continuously or intermittently added to the polymerization reaction system.

<5> The process for producing a fluorinated polymer according to the above <1> or <2>,
wherein the polymerization is carried out in the presence of a chain transfer agent which is at least one member selected from the group consisting of an alcohol, a hydrocarbon, a hydrofluorocarbon, a ketone, a mercaptan, an ester and an ether.

<6> The process for producing a fluorinated polymer according to the above <5>,
wherein the chain transfer agent has water-solubility, and
wherein a slurry obtained by polymerizing the monomer mixture in the polymerization medium is mixed with water so as to dissolve the chain transfer agent in water, followed by recovering the fluorinated polymer and the polymerization medium.

<7> The process for producing a fluorinated polymer according to the above <6>, wherein the polymerization medium recovered is recycled as a polymerization medium to be used for polymerizing the monomer mixture.

<8> The process for producing a fluorinated polymer according to the above <1> or <2>, wherein the monomer mixture contains tetrafluoroethylene as the fluorinated monomer, and further contains ethylene as another monomer.

<9> The process for producing a fluorinated polymer according to any one of the above <1> to <8>, wherein the polar functional group in the polar functional group-containing monomer is at least one member selected from the group consisting of a hydroxy group, a carboxy group, an epoxy group and an acid anhydride residue.

<10> The process for producing a fluorinated polymer according to the above <9>, wherein the polar functional group is an acid anhydride residue.

<11> A fluorinated polymer produced by the process as defined in any one of the above <1> to <10>, wherein the content of a unit based on the polar functional group-containing monomer is from 0.01 to 5 mol % in all units.

Advantageous Effects of Invention

According to the process for producing a fluorinated polymer of the present invention, it is possible to efficiently produce a fluorinated polymer excellent in adhesion, by using a polymerization medium having a low ozone layer depletion potential.

DESCRIPTION OF EMBODIMENTS

In this specification, a repeating unit formed by polymerizing a monomer will be referred to as "unit".
(Process for Producing Fluorinated Polymer)

The process for producing a fluorinated polymer of the present invention, comprises polymerizing a monomer mixture comprising a fluorinated monomer and a polar functional group-containing monomer (excluding one having a fluorine atom) in a polymerization medium, wherein the polymerization medium contains a medium compound represented by the following formula (1) (hereinafter, also referred to as medium compound (1)), and wherein a solution obtained by dissolving the polar functional group-containing monomer in the polymerization medium is continuously or intermittently added to a polymerization reaction system:

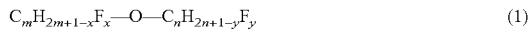

$$C_mH_{2m+1-x}F_x\text{—O—}C_nH_{2n+1-y}F_y \qquad (1)$$

wherein m is an integer of from 1 to 6, n is an integer of from 1 to 6, x is from 0 to (2m+1), y is from 0 to 2n, and (x+y) is at least 1.

Now, the respective constructions of the present invention will be described.
(Polymerization Medium)

The polymerization medium used in the present invention contains the medium compound (1).

Since the solubility of the polar functional group-containing monomer in the medium compound (1) is high, polymerization uniformly proceeds with ease. In a case where the polymerization uniformly proceeds, adhesion of the resulting fluorinated polymer becomes high.

Further, the medium compound (1), which has a low chain transfer constant, hardly acts as a chain transfer agent, as is different from a hydrochlorofluorocarbon such as 1,3-dichloro-1,1,2,2,3-pentafluoropropane. Therefore, the medium compound (1) will be less influential over the concentration of the chain transfer agent in the polymerization reaction system. Further, the molecular weight of the fluorinated polymer obtained will be less variable by the medium compound (1).

Further, the medium compound (1) has low solubility in water, and is thereby hardly recovered by water even when the fluorinated polymer obtained is granulated in water.

As a specific example of the medium compound (1), $CF_3CH_2OCF_2CF_2H$, $HCF_2CF_2CH_2OCF_2H$, $CH_3OCF_2CF_2CF_2CF_3$, $CH_3OCF_2CF(CF_3)_2$ or $CF_3CFHCF_2OCF_3$ may be mentioned. Among them, $CF_3CH_2OCF_2CF_2H$ is particularly preferred from the viewpoint that it hardly acts as a chain transfer agent since its chain transfer constant is sufficiently small, that handling is easy since its boiling point is sufficiently higher than room temperature and at most 100° C., and that a slurry of a fluorinated polymer can be granulated while evaporating and recovering a polymerization medium in water.

$C_mH_{2m+1-x}F_x$ and $C_nH_{2n+1-y}F_y$ in the formula of the medium compound (1) may be linear or branched. The total number of carbon atoms in $C_mH_{2m+1-x}F_x$ and $C_nH_{2n+1-y}F_y$ is preferably from 3 to 8, more preferably from 4 to 6. If the total number is lower than the lower limit, handling of the medium compound is difficult since its boiling point is too low. On the other hand, if the total number is higher than the upper limit, it is difficult to separate the medium compound from a polymer since its boiling point is too high.

The total number of fluorine atoms of $C_mH_{2m+1-x}F_x$ and $C_nH_{2n+1-y}F_y$ is preferably at least 60%, more preferably from 65 to 80%, to the total number of hydrogen atoms and fluorine atoms. When the proportion of fluorine atoms becomes high, the chain transfer constant becomes small, such being preferred, but if it becomes too high, the global warming potential becomes high, such being undesirable. Further, if the proportion of hydrogen atoms is too high, the chain transfer constant becomes high, such being undesirable.

Further, it is preferred that both of $C_mH_{2m+1-x}F_x$ and $C_nH_{2n+1-y}F_y$ have a fluorine atom and a hydrogen atom, that is, x is at least 1 and further y is at least 1, since the chain transfer constant becomes lower when both of a fluorine atom and a hydrogen atom are present. However, if m is 1 or 2, the chain transfer constant is sufficiently low even when x is 0.

Moreover, by the presence of a fluorine atom and a hydrogen atom on both sides of the etheric oxygen atom in the medium compound (1), that is, by incorporating a fluorine atom and a hydrogen atom in both of $C_mH_{2m+1-x}F_x$ and $C_nH_{2n+1-y}F_y$, the polarity of the medium compound (1) becomes high, and therefore the solubility of the polar functional group-containing monomer becomes higher.

The boiling point of the polymerization medium is preferably from 20 to 120° C., more preferably from 40 to 100° C., most preferably from 50 to 90° C. Particularly in the step of heating a slurry of the polar functional group-containing fluorinated polymer obtained in the polymerization while stirring with water and recovering e.g. the polymerization medium while granulating the polymer, the boiling point of the polymerization medium is preferably lower than 100° C.

The concentration of the medium compound (1) in the polymerization medium is preferably at least 50 vol %, more preferably at least 80 vol %, most preferably at least 90 vol %, in view of high solubility of the polar functional group-containing monomer and dispersability of the monomer in a polymerization tank. In particular, the concentration of the medium compound (1) may be 100 vol % in the polymerization medium.

Another medium other than the medium compound (1) in the polymerization medium is preferably a compound having low chain transfer reactivity. Specific examples of such another medium include a perfluorocarbon such as n-perfluorohexane, n-perfluoroheptane, perfluorocyclobutane, perfluorocyclohexane or perfluorobenzene, and a hydrofluorocarbon such as 1,1,2,2-tetrafluorocyclobutane, $CF_3CFHCF_2CF_2CF_3$, $CF_3(CF_2)_4H$, $CF_3CF_2CFHCF_2CF_3$, $CF_3CFHCFHCF_2CF_3$, $CF_2HCFHCF_2CF_2CF_3$, $CF_3(CF_2)_4CF_2H$, $CF_3CH(CF_3)CF_2CF_2CF_3$, $CF_3CF(CF_3)CFHCF_2CF_3$, $CF_3CF(CF_3)CFHCFHCF_3$, $CF_3CH(CF_3)CFHCF_2CF_3$, $CF_3CF_2CH_2CH_3$ or $CF_3(CF_2)_3CH_2CH_3$.

(Fluorinated Monomer)

The monomer mixture used in the present invention contains a fluorinated monomer.

The fluorinated monomer is not particularly limited so long as it has fluorine. Such a fluorinated monomer may be the following (1) to (7).

(1) Tetrafluoroethylene (hereinafter referred to as TFE) or chlorotrifluoroethylene (hereinafter referred to as CTFE).

(2) A compound represented by the formula $CH_2=CX(CF_2)_nY$ (wherein X and Y are each independently a hydrogen atom or a fluorine atom, n is an integer of from 2 to 8) (hereinafter also referred to as FAE).

(3) A fluoroolefin having a hydrogen atom in an unsaturated group, such as vinylidene fluoride (VDF), vinyl fluoride (VF), trifluoroethylene or hexafluoroisobutylene (HFIB).

(4) A fluoroolefin (provided that TFE and CTFE are excluded) having no hydrogen atom in an unsaturated group, such as hexafluoropropylene (hereinafter referred to as HFP).

(5) A perfluoro(alkyl vinyl ether) (hereinafter referred to as PAVE) such as perfluoro(methyl vinyl ether) (PMVE), perfluoro(ethyl vinyl ether) (PEVE), perfluoro(propyl vinyl ether) (PPVE) or perfluoro(butyl vinyl ether) (PBVE).

(6) A perfluorovinyl ether having two unsaturated bonds, such as $CF_2=CFOCF_2CF=CF_2$ or $CF_2=CFO(CF_2)_2CF=CF_2$.

(7) A fluorinated monomer having an aliphatic cyclic structure, such as perfluoro(2,2-dimethyl-1,3-dioxol) (PDD), 2,2,4-trifluoro-5-trifluoromethoxy-1,3-dioxol or perfluoro(2-methylene-4-methyl-1,3-dioxolane).

Among the above (1) to (7), (1) is preferred, and TFE is more preferred in (1), in view of e.g. more excellent heat resistance, chemical resistance, weather resistance and non-tackiness.

As the fluorinated monomer, one type may be used alone, or two or more types may be used in combination.

As the fluorinated monomer, it is preferred to use the above (1) in combination with at least one of the above (2) to (7), it is more preferred to use (1) in combination with at least one of (2), (4) and (5), and it is most preferred to use (1) in combination with (4) and (5), in view of e.g. more excellent heat resistance, chemical resistance, weather resistance and non-tackiness.

As for FAE of the above (2), if n is less than 2 in the formula $CH_2=CX(CF_2)_nY$ (wherein X and Y are each independently hydrogen atom or a fluorine atom, n is an integer of from 2 to 8), characteristics of the after-mentioned molded product made of ETFE may be insufficient (e.g. occurrence of stress crack). On the other hand, if n exceeds 8 in the formula, the polymerization reactivity may be insufficient. When n is from 2 to 8, the after-mentioned molded product made of ETFE will be excellent in characteristics such as heat resistance, chemical resistance, weather resistance or non-tackiness, and the polymerization reactivity of FAE will be also excellent.

Specific examples of FAE include $CH_2=CF(CF_2)_2F$, $CH_2=CF(CF_2)_3F$, $CH_2=CF(CF_2)_4F$, $CH_2=CF(CF_2)_5F$, $CH_2=CF(CF_2)_8F$, $CH_2=CF(CF_2)_2H$, $CH_2=CF(CF_2)_3H$, $CH_2=CF(CF_2)_4H$, $CH_2=CF(CF_2)_5H$, $CH_2=CF(CF_2)_8H$, $CH_2=CH(CF_2)_2F$, $CH_2=CH(CF_2)_3F$, $CH_2=CH(CF_2)_4F$, $CH_2=CH(CF_2)_5F$, $CH_2=CH(CF_2)_6F$, $CH_2=CH(CF_2)_8F$, $CH_2=CH(CF_2)_2H$, $CH_2=CH(CF_2)_3H$, $CH_2=CH(CF_2)_4H$, $CH_2=CH(CF_2)_5H$ and $CH_2=CH(CF_2)_8H$.

Among them, FAE is preferably a compound represented by the formula $CH_2=CH(CF_2)_nY$. n in the formula is preferably from 2 to 6, more preferably from 2 to 4. When n is within this range, the after-mentioned molded product made of ETFE is remarkably excellent in stress crack resistance.

As FAE, one type or two or more types may be used.

(Polar Functional Group-Containing Monomer)

The monomer mixture used in the present invention contains a polar functional group-containing monomer.

The polar functional group-containing monomer is not particularly limited so long as it has a polar functional group but has no fluorine atoms.

The polar functional group in the polar functional group-containing monomer may be a hydroxy group, a carboxy group, an epoxy group or an acid anhydride residue, and among them, an acid anhydride residue is preferred. By introducing the acid anhydride residue into the fluorinated polymer, it is possible to achieve more preferred adhesion to polyamide.

Specific examples of the polar functional group-containing monomer include a vinyl ether having a hydroxy group and an epoxy group; maleic acid, itaconic acid, citraconic acid or undecylenic acid having a carboxy group; and maleic anhydride itaconic anhydride, citraconic anhydride or himic anhydride having an acid anhydride residue. Among them, the polar functional group-containing monomer is preferably maleic anhydride, itaconic anhydride or himic anhydride more preferably itaconic anhydride and/or himic anhydride, since such a monomer is more easily dissolved in a polymerization medium containing the medium compound (1) and is easily added to the polymerization reaction system.

The solubility of the polar functional group-containing monomer in the polymerization medium at 25° C. is preferably at least 1 mass %, more preferably at least 2 mass %, most preferably at least 5 mass %. If the solubility is less than 1 mass %, it is necessary to use a large amount of a polymerization medium in order to dissolve the polar functional group-containing monomer, and therefore the concentration of the polar functional group-containing monomer becomes low, such being undesirable. Further, by the presence in a solvent in which the solubility is low, the polar functional group-containing monomer is not uniformly dispersed, whereby the polar functional group-containing monomer is less likely to copolymerize with the fluorinated monomer.

Further, in the polymerization medium in which the solubility of the polar functional group-containing monomer is low, an oligomer tends to be produced from molecules of the polar functional group-containing monomer, and such an oligomer may inhibit adhesion, whereby sufficient adhesion strength may not be obtained.

There is a tendency that a fluorinated solvent, which usually has extremely small or no polarity, hardly dissolves a compound having a polarity. However, the above-mentioned medium compound (1), which has an oxygen atom in its molecule, can dissolve the polar functional group-containing monomer at a relatively high concentration. Therefore, the polymerization uniformly proceeds with ease, and adhesion of the fluorinated polymer becomes high.

Further, the medium compound (1) of the present invention has a low chain transfer constant. The low chain transfer constant means that the compound is less likely to be a chain transfer agent, and the concentration of the chain transfer agent in the reaction system is less variable. Accordingly, the molecular weight of the fluorinated polymer is less variable, whereby the adhesion of the fluorinated polymer can be increased.

When a solution obtained by dissolving the polar functional group-containing monomer in a polymerization medium containing the medium compound (1) is continuously or intermittently added to the polymerization reaction system, the concentration of the polar functional group-containing monomer in the solution is preferably from 1.0 to 20 mass %, more preferably from 1.2 to 10 mass %, most preferably from 1.3 to 5.0 mass %. If the concentration of the polar functional group-containing monomer is too low, the amount of the polymerization medium to be added together with the monomer becomes large, whereby the polar functional group-containing monomer is less likely to be taken into the fluorinated polymer, such being undesirable. If the concentration of the polar functional group-containing monomer is too high, molecules of the polar functional group-containing monomer are preferentially reacted each other since the reactivity between the polar functional group-containing monomer and the fluorinated monomer is not high. Therefore, an oligomer of the polar functional group-containing monomer, which acts as an adhesion inhibition substance, may easily be produced. Further, in the aimed fluorinated polymer, the proportion of the units based on the polar functional group-containing monomer may be low.

(Another Monomer)

The monomer mixture used in the present invention may also contain another monomer other than the fluorinated monomer and the polar functional group-containing monomer.

Such another monomer may, for example, be ethylene (hereinafter also referred to as "E") or an α-olefin such as propylene or butene. Among them, e.g. ethylene, propylene or 1-butene is preferred, and ethylene is more preferred, in view of excellent physical properties such as heat resistance or mechanical properties of the polymer obtainable.

(Additive)

In the process for producing a fluorinated polymer of the present invention, an additive such as a chain transfer agent or a polymerization initiator, which is usually used for polymerization reaction, may be added to the polymerization reaction system.

<Chain Transfer Agent>

In the process for producing a fluorinated polymer of the present invention, the polymerization reaction is preferably carried out in the presence of a chain transfer agent. By the presence of the chain transfer agent, it is possible to easily adjust the molecular weight of the fluorinated polymer to be produced.

The chain transfer agent may be a known one usually used for polymerization reaction.

The chain transfer agent is preferably e.g. an alcohol such as methanol, ethanol, 2,2,2,-trifluoroethanol, 2,2,3,3-tetrafluoropropanol, 1,1,1,3,3,3-hexafluoroisopropanol or 2,2,3,3,3-pentafluoropropanol; a hydrocarbon such as n-pentane, n-hexane or cyclohexane; a hydrofluorocarbon such as $CF_2H_2$; a ketone such as acetone; a mercaptan such as methyl mercaptan; an ester such as methyl acetate or ethyl acetate; or an ether such as diethyl ether or methyl ethyl ether, in view of a high chain transfer constant and a small amount of addition.

Among them, at least one member selected from the group consisting of an alcohol, a hydrocarbon and a hydrofluorocarbon is preferred, and an alcohol and/or a hydrocarbon is more preferred, in view of higher chain transfer constant and higher stability of terminal groups in a polymer obtainable.

Among alcohols, methanol or ethanol is most preferred since it is easily soluble in water and easily separated from the fluorinated polymer obtained after the production.

Among hydrocarbons, n-pentane or cyclohexane is most preferred, in view of higher chain transfer constant, higher stability of terminal groups in a polymer obtainable, and a boiling point of sufficiently higher than room temperature and at most 100° C.

<Polymerization Initiator>

In the production of a fluorinated polymer, a polymerization initiator is usually used for initiating the polymerization reaction.

The polymerization initiator is preferably a radical polymerization initiator of which the temperature at which the half life is 10 hours is from 0 to 100° C., more preferably from 20 to 90° C. Specific examples of the polymerization initiator include an azo compound such as azobisisobutyronitrile; a peroxydicarbonate such as diisopropyl peroxydicarbonate; a peroxyester such as tert-butyl peroxypivalate, tert-butyl peroxyisobutyrate or tert-butyl peroxyacetate; a non-fluorinated diacyl peroxide such as isobutyryl peroxide, octanoyl peroxide, benzoyl peroxide or lauroyl peroxide, a fluorinated diacyl peroxide such as $(Z(CF_2)_pCOO)_2$ (wherein Z is a hydrogen atom, a fluorine atom or a chlorine atom, and p is an integer of from 1 to 10); perfluoro-tert-butyl peroxide; and an inorganic peroxide such as potassium persulfate, sodium persulfate or ammonium persulfate.

(Fluorinated Polymer)

The fluorinated polymer produced by the present invention is one obtainable by polymerizing a monomer mixture comprising a fluorinated monomer and a polar functional group-containing monomer (excluding one having a fluorine atom) in a polymerization medium, and has at least a unit based on the above fluorinated monomer and a unit based on the above polar functional group-containing monomer.

The fluorinated monomer to form the unit based on the fluorinated monomer, and the polar functional group-containing monomer to form the unit based on the polar functional group-containing monomer, are the same as mentioned above.

The fluorinated polymer may, for example, be the following.

(i) A copolymer having a unit based on TFE, a unit based on PAVE and a unit based on the polar functional group-containing monomer.

(ii) A copolymer having a unit based on TFE, a unit based on HFP and a unit based on the polar functional group-containing monomer.

(iii) A copolymer having a unit based on TFE, a unit based on PAVE, a unit based on HFP and a unit based on the polar functional group-containing monomer.

(iv) A copolymer having a unit based on E, a unit based on TFE and a unit based on the polar functional group-containing monomer.

(v) A copolymer having a unit based on E, a unit based on CTFE and a unit based on the polar functional group-containing monomer.

(vi) A copolymer having a unit based on E, a unit based on TFE, a unit based on HFP and a unit based the polar functional group-containing monomer.

(vii) A copolymer having a unit based on E, a unit based on TFE, a unit based on FAE and a unit based on the polar functional group-containing monomer.

Hereinafter, the copolymer having a unit based on E, a unit based on TFE and a unit based on the polar functional group-containing monomer, such as the above (iv), (vi) or (vii), will be generally referred to as ETFE.

In ETFE, a molar ratio of the unit based on E to the unit based on TFE (i.e. E/TFE ratio) is preferably from 80/20 to 20/80, more preferably from 70/30 to 30/70, most preferably from 50/50 to 35/65.

If the E/TFE ratio is higher than the above upper limit, e.g. the heat resistance, the weather resistance, the chemical resistance, the chemical barrier performance of a molded product made of ETFE may sometimes deteriorate. On the other hand, if the E/TFE ratio is lower than the above lower limit, e.g. the mechanical strength, the melt-moldability of the molded product made of ETFE may sometimes deteriorate. When the E/TFE ratio is within the above range, the molded product made of ETFE will be excellent in e.g. the heat resistance, the weather resistance, the chemical resistance, the chemical barrier performance, the mechanical strength or the melt-moldability.

In a case where ETFE has a unit based on FAE, the content of the unit based on FAE is preferably from 0.01 to 20 mol %, more preferably from 0.1 to 15 mol %, most preferably from 0.2 to 5 mol %, in all the units. If the content of the unit based on FAE is less than 0.01 mol %, the stress crack resistance of a molded product made of the fluorinated polymer tends to be low, and a breakage phenomenon such as cracking under a stress may occur. On the other hand, if it exceeds 20 mol %, the mechanical strength of the molded product may be low. When the content of the unit based on FAE is within the above range, the molded product will be excellent in characteristics such as the stress crack resistance or the mechanical strength.

The content of the unit based on the polar functional group-containing monomer in the fluorinated polymer is preferably from 0.01 to 5 mol %, more preferably from 0.05 to 3 mol %, most preferably from 0.1 to 1 mol %, in all the units. If the content of the unit based on the polar functional group-containing monomer is lower than the above lower limit, adhesion may be insufficient. On the other hand, if the content of the unit based on the polar functional group-containing monomer is higher than the above upper limit, characteristics inherent in the fluorinated polymer may be impaired, or adhesion may be deteriorated by the production of an oligomer of the polar functional group-containing monomer. When the content of the unit based on the polar functional group-containing monomer is within the above range, the adhesion of the fluorinated polymer becomes more excellent.

The volume flow rate (hereinafter referred to as a value Q) of the fluorinated polymer is preferably from 0.1 to 500 mm$^3$/sec, more preferably from 1 to 100 mm$^3$/sec, most preferably from 5 to 50 mm$^3$/sec. The value Q is an index representing melt flowability of the fluorinated polymer, and will be an index for the molecular weight. The higher the value Q is, the lower the molecular weight becomes, and the lower the value Q is, the higher the molecular weight becomes. The value Q is an extrusion rate of the fluorinated polymer at the time of extruding it into an orifice with a diameter of 2.1 mm and a length of 8 mm under a load of 7 kg at a temperature higher by 50° C. than the melting point of the resin by means of a flow tester manufactured by Shimadzu Corporation. When the value Q is within the above range, the fluorinated polymer is excellent in e.g. extrusion moldability and mechanical strength.

(Production Process)

In the process for producing a fluorinated polymer of the present invention, a solution obtained by dissolving the polar functional group-containing monomer in the polymerization medium containing the medium compound (1) is continuously or intermittently added to the polymerization reaction system.

Here, when the polar functional group-containing monomer is added to the polymerization reaction system, it is preferred that the monomer is not dissolved in a chain transfer agent. If the monomer is dissolved in a chain transfer agent, a change in the concentration of the chain transfer agent in the polymerization tank may be large, whereby a fluorinated polymer having a broad molecular weight distribution tends to be produced.

Further, with a view to suppressing production of an adhesion inhibition substance (an oligomer of molecules of the polar functional group-containing monomer), it is preferred that no polar functional group-containing monomer is present in the polymerization reaction system before adding a solution obtained by dissolving the polar functional group-containing monomer in the polymerization medium to the polymerization reaction system at the beginning. However, at a concentration at which no adhesion inhibition substance is produced, the polar functional group-containing monomer may be present in a small amount in the polymerization reaction system before adding a solution obtained by dissolving the polar functional group-containing monomer in the polymerization medium to the polymerization reaction system at the beginning. The concentration of the polar functional group-containing monomer which may be present in advance in the polymerization reaction system is preferably at most 100 ppm, more preferably at most 50 ppm, most preferably 20 ppm.

The process for producing a fluorinated polymer of the present invention may, for example, be suspension polymerization, solution polymerization or emulsion polymerization, and among them, suspension polymerization or solution polymerization is preferred.

The polymerization condition is not particularly limited. The polymerization temperature is preferably from 0 to 100° C., more preferably from 20 to 90° C. The polymerization pressure is preferably from 0.1 to 10 MPaG, more preferably from 0.5 to 3 MPaG. The polymerization time is preferably from 1 to 30 hours, more preferably from 2 to 20 hours.

(Applications)

The fluorinated polymer produced by the present invention is excellent in adhesion to various materials.

The material to which the fluorinated polymer adheres, may, for example, be a metal (such as iron, copper or stainless steel), glass, a plastic or a rubber.

Specific examples of plastics include a polyester such as polyethylene terephthalate, polybutylene terephthalate, polyethylene naphthalate or polybutylene naphthalate; a polyolefin such as polyethylene or polypropylene; and an ethylene/vinyl acetate copolymer, polyvinyl acetate, polyvinyl alcohol, an ethylene/vinyl alcohol copolymer, polystyrene, polyvinylidene chloride, polyacrylonitrile, polyoxymethylene, polyphenylene sulfide, polyphenylene ether, polycarbonate, polyamide imide, polyimide, polyether imide, polysulfone, polyarylate, polyamide or polyurethane.

The fluorinated polymer produced by the present invention is used alone or laminated with such a plastic, whereby a molded product such as a tube, a hose, a tank, a seal, a wire, a cable, a film, a sheet, a bottle or a fiber is obtained.

The tube or hose may be a coating line tube or hose, a chemical tube or hose, an agricultural chemical tube or hose, a beverage tube or hose, a hydraulic tube or hose, an underground buried tube to be used in a fuel supplying station such as a gas station, an automobile fuel piping tube or hose, a filler neck hose, an automobile radiator hose, a brake hose, an air conditioner hose, a fuel cell hose, an electrical component hose, an industrial hose for transporting e.g. a fruit juice or paste foods, an ink tube, a chemical tube, an air pressure tube or hose, a fuel transportation hose for e.g. gas, light oil or alcohol, or a hot water supply hose.

The tank may, for example, be an automobile radiator tank, a chemical tank, a chemical bag, a multilayer bottle for a chemical storage container, a fuel tank, a container for highly corrosive and erosive chemicals, such as acids and alkalis for semiconductor chemicals or the like, a container for slurry of an abrasive, or an urea water container in a system for reducing NOX by spraying the urea water to diesel engine exhaust gas.

The seal may, for example, be a seal layer for a LIB aluminum laminate, various automobile seals such as an O ring for a fuel pump, a chemical-related seal such as a seal for a flow meter or a pump for chemical agents, or various mechanical-related seals such as a hydraulic equipment seal.

An electric wire covering material such as a wire or cable, may be suitably used for e.g. a wrapping wire, an automobile wire, an aircraft wire, a robot wire, a motor coil wire or a foaming wire. Especially when used in a high-frequency area, it may be suitably used for high-frequency transmission, such as a high-frequency transmission circuit, an application for a cable such as a coaxial cable, a LAN cable or a flat cable for a communication system such as a base station, a small size electronic device such as a cellular phone, or a printed wiring substrate.

The film or sheet may be a single layer or a multilayer film (or called a laminate) using it at least a part of the film. For example, an electronic substrate interlayer dielectric film, a laminated steel plate film used for a building material or a can for storing a solvent or a solution, a battery package for a lithium ion battery, laminated with a metal foil such as aluminum as a soft moisture-proof package, a medical or a chemical solution soft package material laminated with e.g. polyethylene, polypropylene or ethylene/vinyl acetate copolymer, a laminate film for a transfusion bag or a blood bag, an industrial film for an agricultural green house or a membrane structure, a releasing film, specifically a single layer or a multilayer releasing film for producing a cast film, a releasing film for producing a wiring substrate or an IC chip, a releasing film made of a laminate with e.g. polyethylene terephthalate or a releasing film to be used for molding a light emitting diode sling material, may be mentioned. It may be used for industrial field for e.g. a food packaging or a wrapping film, a slide member requiring a high chemical resistance, such as a diaphragm for a diaphragm pump or various packing, a belt conveyer, an insulation coating film for a wire, a beverage can material made of a laminate with a stainless steel sheet, a cooking tool surface protecting sheet, an interior or exterior decorative board protecting film, a coating film for a vapor outlet member of a humidifier, an exterior material or a roof material made of a laminate sheet with e.g. polycarbonate, a belt made of a laminate with an urethane resin or glass cloth, a balloon material made of a laminate with an aramid woven fabric, a membrane structure film made of a laminate with e.g. polyamide, ethylene vinyl acetate resin or a rubber, a solar battery surface material made of a laminate with an aluminum sheet, a heat seal packaging material made of a laminate with e.g. an aluminum foil, a multilayer film for a white board, a protective film for a highway sound-proof wall, a laminate film for a shower shielding curtain, a wall paper laminate film, a heat-resistant pouch film, a laminate glass interlayer, an agricultural greenhouse film, an adhesion film, a chemical resistant covering film for a rubber plug, a solar battery protecting film, a motor insulation film, an office automation (OA) roll or belt obtained by laminating with a fluorinated polymer film, a printed wiring substrate using a laminate of a fluorinated polymer and a polyimide and further using a metal foil such as a copper foil, a printed wiring substrate using a laminate of a composite laminate of a fluorinated polymer and a fiber substrate with a metal foil, a radar requiring high frequency characteristics, a network router, a backplane or a wireless infrastructure.

It may be also used for a substrate for various sensors for automobiles or engine management sensors requiring chemical resistance or heat resistance. Further, it may be also used for a substrate material for an ID tag. Moreover, it may be also used for a buildup printed wiring substrate or a flexible printed wiring substrate.

In addition to the above applications, the above flexible printed wiring substrate, which has features such as low-dielectric constant and high bending resistance, may be also used for a cellular phone, a mobile device, a notebook type personal computer, a digital camera, a video camera, a memory audio player, a hard disk drive or various optical drives. Besides, it may be also used for a laminate type printed wiring substrate, a multilayer monofilament, a wiring or piping cover duct (protective piping), protection of an exterior member for a building materiel, called an exterior, a building material such as an exterior wall protection or an interior wall, a rubber hose mandrel core material, a light guiding rope, a food machine belt, a food transportation belt, a flange gasket for a carburetor, or a gear.

The shape of the molded product is not particularly limited, and it may be formed into various shapes such as a sheet, a film, a rod or a pipe. As a typical example of applications employing such a shape, a semiconductor/liquid crystal production device component such as a CMP retainer ring, an etching ring, a silicon wafer carrier or an IC chip tray, a small type button cell, a cable connector, an aluminum electrolytic capacitor case, a thrust washer, an oil filter, a gear for automatic air conditioner control unit, a gear for a throttle body, ABS parts, an AT seal ring, a MT shift fork pad, a bearing, a seal, a clutch ring compressor component, a cable for a mass transportation system, a conveyer belt chain, an oil fields development, a machine connector, a pump component for a hydraulic driving system (such as a bearing, a port plate, a ball joint for a piston), a gear, a seal ring for a piston, a cabin interior component for aircraft, a fuel pipe protection material, food/beverage production facility component, a medical tool component (a sterilization tool, a tool for a gas/liquid chromatograph), a molded product for preventing aquatic organism, a hydrogen station material, a fuel cell material, an organic EL material, an electric or electronic component represented by a sensor, an LED lamp, a surface mount connector, a socket, a resistor, a relay case, a switch, a coil bobbin, a capacitor, a variable capacitor case, an optical pickup, an oscillator, various terminal strips, a transformer, a plug, a tuner, a speaker, a microphone, a headphone a small motor, a magnetic head base, a power module, a semiconductor, a liquid crystal, a FDD carriage, a FDD chassis, a motor brush holder, a parabola antenna or a computer-related component, a VTR component, a TV set component, an iron, a hairdryer, a rice cooker component, a microwave oven component, an acoustic component, an audio/video device component such as audio/laser disk (registered trademark), a compact disk or a digital video disk, a home or an office electronic product component represented by a lighting component, a refrigerator component, an air conditioner component, a typewriter component or a word processor component, an office computer-related component, a telephone-related component, a facsimile-related component, a copying machine-related component, a machine-related component represented by a cleaning jig, a motor component, a lighter or a typewriter, an optical device or a precise machinery-related component represented by a microscope, a binocular, a camera or a watch, a plumbing component such as a water faucet frame, a water mixing faucet, a pump component, a pipe joint, a water control valve, a relief valve, a hot water temperature sensor, a water metering sensor or a water meter housing, an automobile or a vehicle-related component such as a valve alternator terminal, an alternator connector, an IC regulator, a potential meter base for a light dimmer, various valves such as an exhaust gas valve, various pipes for fuel, exhaust and intake systems, an air intake nozzle snorkel, an intake manifold, a fuel pump, an engine cooling water joint, a carburetor main body, a carburetor spacer, an exhaust gas sensor, a cooling water sensor, an oil temperature sensor, a throttle position sensor, a crankshaft position sensor, an air flow meter, a brake pad friction sensor, a thermostat base for an air conditioner, a heater hot air flow control valve, a brush holder for a radiator motor, a water pump impeller, a turbine vane, a wiper motor-related component, a distributor, a starter switch, a starter relay, a wire harness for transmission, a window washer nozzle, an air conditioner panel switch board, a fuel system electromagnetic bulb coil, a connector for a fuse, a horn terminal, an electrical component insulating board, a step motor rotor, a lamp socket, a lamp reflector, a lamp housing, a brake piston, a solenoid bobbin, an engine oil filter, an ignition device case, a vehicle speed sensor or a cable liner, a medical product, or other various applications, may be exemplified.

Further, the fluorinated polymer obtainable by the present invention may be formed into a powder so as to be used as a coating material. Applications of an article coated with the fluorinated polymer powder may, for example, be a cooking utensil such as a frying pan, a pressure cooker, a pan, a grill pan, a cooking kettle, an oven, a hot plate, a baking mold, a knife or a gas table; a kitchen supply such as an electric kettle, an ice tray, a mold or a range food; a food industry component such as a kneading roll, a rolling roll, a conveyer or a hopper; an industrial article such as an office automation (OA) roll, an OA belt, an OA separation claw, a paper roll or a calendar roll for producing a film; a mold for molding e.g. a polystyrene foam, a casting mold or a mold release such as a mold plate for producing a plywood or veneer, and an industrial container (especially for the semiconductor industry). One utilizing the sliding property, may, for example, be a tool such as a saw or an abrasive; household product such as an iron, scissors, or a knife; a metal foil, a wire, a slide bearing for e.g. a food processing machine, a packaging machine or a textile machinery, a sliding component for a camera or watch, an automobile component such as a pipe, a valve or a bearing, a snow shovel, a plow, a shoot, a coil wire for a motor, a sealing material for an electrical or electronic component or an exhaust duct.

Further, the fluorinated polymer obtainable in the present invention is also useful as an additive for FRP, especially a carbon-reinforced plastic (CFRP) using a carbon fiber as a reinforcing fiber (a fiber base material). As FRP and CFRP, the fluorinated polymer may be formed into a powder, pellets or a film, and used as the main component in the resin component.

FRP and CFRP may, for example, be used for a case for an electric or electronic device such as a personal computer, a display, an OA equipment, a cellular phone, a portable information terminal, a facsimile, a compact disk, a portable MD, a portable radio cassette, a PDA (portable information terminal such as electronic pocket book), a video camera, a digital steel camera, an optical equipment, an audio equipment, an air conditioner, an illumination equipment, amusement goods, toy goods or other electric household appliances, an inner member such as a tray or a chassis or a casing thereof, a member for mechanisms, a building material such as a panel, an automobile-related or two wheeled vehicle-related component, member or outer panel, such as motor parts, an alternator terminal, an alternator connector, an IC regulator, a potentiometer base for light dimmer, a suspension component, various valves such as an exhaust gas valve, various pipes for fuel, exhaust system or an intake system, an air intake nozzle snorkel, an intake manifold, various arms, various frames, various hinges, various bearings, a fuel pump, a gasoline tank, a CNG tank, an engine cooling water joint, a calibrator main body, a calibrator spacer, an exhaust gas sensor, a cooling water sensor, an oil temperature sensor, a brake pad wear sensor, a throttle position sensor, a crack shaft position sensor, an air flow meter, a brake pad abrasion sensor, a thermostat base for an air conditioner, a heater hot air flow control valve, a brush holder for a radiator motor, a water pump impeller, a turbine vane, a wiper motor-related component, a distributer, a starter switch, a starter relay, a wire harness for transmission, a window washer nozzle, an air conditioner panel switch board, a fuel system electromagnetic bulb coil, a connector for a fuse, a battery tray, an AT bracket, a head lamp support, a pedal housing, a handle, a door beam, a protector, a chassis, a frame, an arm rest, a horn terminal, a step motor rotor, a lamp socket, a lamp reflector, a lamp housing, a brake piston, a noise shield, a radiator support, a spare tire cover, a sheet shell, a solenoid bobbin, an engine oil filter, an ignition device case, an undercover, a scuff plate, a pillar trim, a propeller shaft, a wheel, a fender, a facer, a bumper, a bumper beam, a bonnet, aero parts, a platform, a cowl louver, a roof, an instrument panel, a spoiler or various modules, an aircraft-related component, member or outer panel, such as landing gear pod, a winglet, a spoiler, an edge, a ladder, an elevator, a fairing or rib, or a blade of an windmill.

In particular, it is preferably used for an aircraft member, a blade for a windmill, an outer panel for an automobile, a case for an electronic device, a tray or a chassis.

(Operation and Effect)

In accordance with the production process of the present invention, a solution obtained by dissolving the polar functional group-containing monomer in the polymerization medium containing the medium compound (1) is continuously or intermittently added to a polymerization reaction system, whereby it is possible to keep the concentration of the polar functional group-containing monomer in the polymerization reaction system at a low level as compared with a case where the polar functional group-containing monomer is charged into the polymerization reaction system all at once or a case where it is added without being dissolved. Since the reactivity between the polar functional group-containing monomer and the fluorinated monomer is not high, the reaction between molecules of the mutual polar functional group-containing monomer preferentially occurs if the concentration of the polar functional group-containing monomer is high, but in a case where the concentration of the polar functional group-containing monomer is low and the fluorinated monomer is present in an excess amount, the reaction of the polar functional group-containing monomer with the fluorinated monomer sufficiently proceeds. Therefore, the unit based on the polar functional group-containing monomer can moderately be taken into the fluorinated polymer. As a result, it is possible to obtain the fluorinated polymer having high adhesion, of the present invention.

On the other hand, if the polar functional group-containing monomer is charged all at once, at an initial stage of the polymerization, or if the polar functional group-containing monomer is continuously or intermittently added to the polymerization reaction system as it is without being dissolved in a polymerization medium, the concentration of the polar functional group-containing monomer in the polymerization reaction system becomes high. If the concentration of the polar functional group-containing monomer in the polymerization reaction system becomes too high, the reaction between molecules of the polar functional group-containing monomer preferentially occurs since the reactivity of the polar functional group-containing monomer with the fluorinated monomer is usually not high. Accordingly, an oligomer of the polar functional group-containing monomers, which acts as an adhesion inhibition substance, may easily produce, and further, the unit based on the polar functional group-containing monomer may decrease in the aimed fluorinated polymer, and as a result, the adhesion strength of the fluorinated polymer cannot be sufficiently obtained.

In the present invention, in a case where a chain transfer agent of which amount of addition can be reduced and further the chain transfer agent is not supplementarily added together with the polar functional group-containing monomer, the concentration of the chain transfer agent is less likely to be high in a mixed fluid containing the chain transfer agent and the polymerization medium recovered after the polymerization. Further, in a case where the chain transfer agent has water-solubility, the chain transfer agent is dissolved in an aqueous phase and easily separated and removed during recovering a fluorinated polymer when a slurry obtained by the polymerization is granulated in water. Therefore, it is not necessary to carry out a step of separating a polymerization medium and a chain transfer agent once and readjusting the chain transfer agent so as to be contained in a prescribed amount, or a step of newly adding a polymerization medium so as to lower the concentration of the chain transfer agent, when the polymerization medium is recycled.

Accordingly, in the present invention, by using a chain transfer agent of which amount of addition can be reduced and further supplementary adding no chain transfer agent together with the polar functional group-containing monomer, the production efficiency is less likely to decrease even when a polymerization medium is recycled. Further, by using a water-soluble chain transfer agent, the production efficiency is further less likely to decrease.

EXAMPLES

Now, the present invention will be described with reference to Examples and Comparative Examples, but it should be understood that the present invention is by no means restricted thereto.

[Evaluation Method]
(Volume Flow Rate; Value Q ($mm^3$/sec))

The value Q is an extrusion rate at the time of extruding a fluorinated polymer from an orifice having a diameter of 2.1 mm and a length of 8 mm under a load of 7 kg at a temperature higher by 50° C. than the melting point of the fluorinated polymer, by means of a flow tester manufactured by Shimadzu Corporation. Here, in this Example, 220° C., 297° C. or 380° C. was selected as a measurement temperature.

(Melting Point (° C.))

The melting point was obtained from the endothermic peak obtained at the time of heating in an air atmosphere up to 300° C. at a rate of 10° C./min by means of a differential scanning calorimeter (DSC7200, manufactured by Seiko Instruments Inc.).

(Content (Mol %) of Polar Functional Group)

Using a 200 μm-thick film obtained by press molding a fluorinated polymer, the adsorption intensity derived from an acid anhydride residue, which appears in a range of from 1,800 to 1,900 $cm^{-1}$, was measured by a Fourier transformation infrared spectrometer (Nicolet iS10, manufactured by Thermo Fisher Scientific Inc.) whereby the content of the acid anhydride residue was calculated.

(Composition (Mol %) of Fluorinated Polymer)

The composition of the fluorinated polymer was calculated from results of total fluorine content measurement and melt F-NMR measurement.

(Interlayer Adhesion (N/cm) between Fluorinated Polymer and Polyamide)

A film of a fluorinated polymer having a thickness of 100 μm and a film of polyamide 12 (3030JI6L, manufactured by Ube Industries, Ltd.) having a thickness of 100 μm, obtainable by press molding, were laminated and melt-bonded at a heating level 9 by using a heat sealer (manufactured by FUJIIMPULSE CO., LTD.). The resulting laminate film was cut into a strip shape having a length of 5 cm and a width of 1 cm to prepare a test piece. Using a tensile tester (type: Tensilon RTC, manufactured by A & D Company, Limited), the peel strength of the test piece was measured and was regarded as interlayer adhesion between the fluorinated polymer and polyamide.

(Interlayer Adhesion (N/cm) between Fluorinated Polymer and Copper Foil or Polyimide Resin)

A polyimide resin (Upilex (registered trademark) VT, manufactured by Ube Industries, Ltd.) having a thickness of 25 μm and a width of 380 mm as layer (A), a rolled copper foil (RCF-T4X-12, manufactured by Fukuda Metal Foil & Powder Co., Ltd.) having a thickness of 12 μm, a width of 380 mm and Rz of 1.0 μm as layer (C) and a fluorinated polymer film having a thickness of 25 μm and a width of 380 mm as layer (B), were laminated in the order of (A)/(B)/(C) and subjected to vacuum pressing at a temperature of 360° C. under a pressure of 3.7 MPaG for 10 minutes to obtain a 62 μm-thick three layer laminated film composed of a polyimide resin layer/a fluorinated polymer layer/a rolled copper foil layer.

The three-layer laminated film was cut to prepare a test specimen having a length of 150 mm and a width of 10 mm, and peeled from the edge to a position at 50 mm in the longitudinal direction of the test specimen. Then, with that position as the center, the film was peeled by means of a tensile tester (type; Tensilon RTC, manufactured by A & D Company, Limited) at a peeling angle of 180° and a tensile speed of 50 mm/min, whereby the maximum load was taken as the interlayer adhesion to a copper foil or a polyimide resin. Here, not a single test specimen was used to measure the interlayer adhesion to a copper foil and a polyimide resin, but two test specimens were prepared, and one test specimen was used to measure the interlayer adhesion between the fluorinated polymer and the copper foil, and the other test specimen was used to measure the interlayer adhesion between the fluorinated polymer and the polyimide resin.

Example 1

A stainless steel polymerization tank provided with a stirrer and a jacket, having an internal capacity of 1.2 L (liter), was evacuated of air, then charged with 1,180 g of $CH_3CH_2OCF_2CF_2H$, 5.7 g of methanol and 7.0 g of $CH_2=CH(CF_2)_2F$, and then charged with 177 g of TFE and 6.1 g of E while stirring the interior of the polymerization tank, followed by letting warm water flow into the jacket so that the internal temperature of the polymerization tank would be 66° C. The internal pressure of the polymerization tank was 1.54 MPaG at that time. After the internal temperature became stable, 9 mL of a $CF_3CH_2OCF_2CF_2H$ solution containing 2 mass % of tert-butylperoxy pivalate was injected to initiate polymerization. During the polymerization, a mixed gas having a molar ratio of TFE/E=60/40 was added thereto so that the internal press would be constant at 1.54 MPaG. In addition, 0.6 mL of $CH_2=CH(CF_2)_2F$ was added every time when 10 g of the TFE/E mixed gas added during the polymerization was consumed, and 2 mL of a $CF_3CH_2OCF_2CF_2H$ solution containing 1.8 mass % of itaconic anhydride was added every time when 5 g of the TFE/E mixed gas was consumed. Here, the saturated solubility of itaconic anhydride in $CF_3CH_2OCF_2CF_2H$ at 25° C. was 5 mass %. After 240 minutes from the initiation of the reaction and addition of 100 g of the mixed gas having a molar ratio of TFE/E=60/40, the polymerization tank was cooled to complete the polymerization.

Thereafter, the remaining monomer gas was purged from the polymerization tank until the pressure would be atmospheric pressure, the resulting slurry was transferred to a container having an internal capacity of 2 L, and water in the same volume as the slurry was added, followed by heating (between 30 and 90° C.), whereby a polymer was separated from the polymerization medium, the chain transfer agent and the remaining monomer. The resulting polymer was dried in an oven at 150° C. to obtain a white powdery polymer 1.

The volume flow rate of the polymer 1 at 297° C. was 23 $mm^3$/sec, the composition was such that TFE/E/$CH_2=CH(CF_2)_2F$/itaconic anhydride=54.8/42.6/2.2/0.4 mol %, the melting point was 239° C., and the interlayer adhesion between the fluorinated polymer and polyamide was 19 N/cm.

Example 2

A stainless steel polymerization tank provided with a stirrer and a jacket, having an internal capacity of 1.3 L (liter), was evacuated of air, then charged with 1,069 g of $CF_3CH_2OCF_2CF_2H$, 10.4 g of methanol and 1.6 g of $CH_2=CH(CF_2)_2F$, and then charged with 159 g of TFE and 6.1 g of E while stirring the interior of the polymerization tank, followed by letting warm water flow into the jacket so that the internal temperature of the polymerization tank would be 66° C. The internal pressure of the polymerization tank was 1.51 MPaG at that time. After the internal temperature became stable, 5 mL of a $CF_3CH_2OCF_2CF_2H$ solution containing 2 mass % of tert-butylperoxy pivalate was injected to initiate the polymerization. During the polymerization, a mixed gas having a molar ratio of TFE/E=60/40 was added so that the internal pressure would be constant at 1.51 MPaG. In addition, 0.4 of $CH_2=CH(CF_2)_2F$ was added every time when 10 g of the TFE/E mixed gas added during the polymerize was consumed, and 2.4 mL of a $CF_3CH_2OCF_2CF_2H$ solution containing 2.1 mass % of itaconic anhydride was added every time when 5 g of the TFE/E mixed gas was consumed. After 370 minutes from the initiation of the reaction and 100 g of the mixed gas having a molar ratio of TFE/E=60/40, the polymerization tank cooled to complete the polymerization.

Thereafter, the remaining monomer gas was purged from the polymerization tank until the pressure would be atmospheric pressure, the resulting slurry was transferred to a container having an internal capacity of 2 L, water in the same volume as the slurry was added, followed by heating (between 20 and 73° C.), whereby a polymer was separated from the polymerization medium, the chain transfer agent and the remaining monomer. The resulting polymer was dried in an oven at 150° C. to obtain a white powdery polymer 2.

The volume flow rate of the polymer 2 at 297° C. was 26 $mm^3$/sec, the composition was such that TFE/E/$CH_2=CH(CF_2)_2F$/itaconic anhydride=56.1/42.9/0.5/0.5 mol %, the melting point was 255° C., and the interlayer adhesion between the fluorinated polymer and polyamide was 22 N/cm.

Example 3

A stainless steel polymerization tank provided with a stirrer and a jacket, having an internal capacity of 1.3 L (liter), was evacuated of air, then charged with 825 g of $CF_3CH_2OCF_2CF_2H$ and 3.2 g of $CH_2=CH(CF_2)_4F$, and then charged with 350 g of HFP, 118 g of TFE and 2.9 g of E while stirring the interior of the polymerization tank, followed by letting warm water flow into the jacket so that the internal temperature of the polymerization tank would be 66° C. The internal pressure of the polymerization tank was 1.47 MPaG at that time. After the internal temperature became stable, 7.4 mL of a $CF_3CH_2OCF_2CF_2H$ solution containing 5 mass % of tert-butylperoxy pivalate was injected to initiate the polymerization. During the polymerization, a mixed gas having a molar ratio of TFE/E=54/46 was added so that the internal pressure would be constant at 1.47 MPaG. In addition, 2 mL of a $CF_3CH_2OCF_2CF_2H$ solution containing 7.1 mass % of $CH_2=CH(CF_2)_4F$ and 1.3 mass % of itaconic anhydride was added every time when 5 g of the TFE/E mixed gas added during the polymerization was consumed. After 370 minutes from the initiation of the reaction and addition of 70 g of the mixed gas having a molar ratio of TFE/E=54.46, the polymerization tank was cooled to complete the polymerization.

Thereafter, the remaining monomer gas was purged from the polymerization tank until the pressure would be atmospheric pressure, the resulting slurry was transferred to a container having an internal capacity of 2 L, water in the same volume as the slurry was added, followed by heating (between 20 and 73° C.), whereby a polymer was separated from the polymerization medium and the remaining monomer. The resulting polymer was dried in an oven at 120° C. to obtain a white powdery polymer 3.

The volume flow rate of the polymer 3 at 220° C. was 11 $mm^3$/sec, the composition was such that TFE/E/HFP/$CH_2=CH(CF_2)_4F$/itaconic anhydride=47.5/43.4/8.3/0.6/0.3 mol %, the melting point was 183° C., and the interlayer adhesion between the fluorinated polymer and polyamide was 12 N/cm.

Example 4

The polymerization medium, methanol and the monomer mixture were charged in the same manner as in Example 1 except that the polymerization medium charged to the polymerization tank at the beginning was changed to 1,120 g of $CF_3CH_2OCF_2CF_2H$ and 67 g of $CF_3(CF_2)_4CF_2H$, and the internal temperature of the polymerization tank was stabilized at 66° C. Thereafter, a polymer 5 was obtained in the same manner as in Example 1 except that 9 mL of a $CF_3CH_2OCF_2CF_2H$ solution containing 2 mass % of tert-butyloxypivalate and 2 mass % of $CF_3(CF_2)_4CF_2H$ was injected to initiate the polymerization.

The volume flow rate of the polymer 5 at 297° C. was 21 mm$^3$/sec, the composition was such that TFE/E/CH$_2$=CH$(CF_2)_2$F/itaconic anhydride=54.9/42.5/2.2/0.3 mol %, the melting point was 239° C., and the interlayer adhesion between the fluorinated polymer and polyamide was 18 N/cm.

Example 5

A stainless steel polymerization tank provided with a stirrer and a jacket, having an internal capacity of 1.3 L (liter), was evacuated of air, then charged with 1,124 g of $CF_3CH_2OCF_2CF_2H$, 2.0 g of methanol and 84.8 g of $CF_2=CF-O-(CF_2)_3F$, and then charged with 159 g of TFE while stirring the interior of the polymerization tank, followed by letting warm water flow into the jacket so that the internal temperature of the polymerization tank would be 50° C. The internal pressure of the polymerization tank was 0.91 MPaG at that time. After the internal temperature became stable, 1 mL of a $CF_3CH_2OCF_2CF_2H$ solution containing 0.05 mass % of bis(perfluorobutyryl)peroxide was injected to initiate the polymerization. During the polymerization, a TFE gas was added so that the internal pressure would be constant at 0.91 MPaG. Further, a $CF_3CH_2OCF_2CF_2H$ solution containing 0.05 mass % of bis(perfluorobutyryl)peroxide was added intermittently so as to maintain a consumption speed of TFE gas being 0.5 g/min. In addition, 1 mL of a $CF_3CH_2OCF_2CF_2H$ solution containing 1 mass % of himic anhydride was added every time when 5 g of the TFE gas added during the polymerization was consumed. Here, the saturated solubility of himic anhydride in $CF_3CH_2OCF_2CF_2H$ at 25° C. was 3 mass %. After 290 minutes from the initiation of the reaction and addition of 140 g of the TFE gas, the polymerization tank was cooled to complete the polymerization.

Thereafter, the remaining monomer gas was purged from the polymerization tank until the pressure would be atmospheric pressure, the resulting slurry was transferred to a container having an internal capacity of 2 L, water in the same volume as the slurry was added, followed by heating (between 40 and 90° C.), whereby a polymer was separated from the polymerization medium, the chain transfer agent and the remaining monomer. The resulting polymer was dried in an oven at 150° C. to obtain a white powdery polymer 6.

The volume flow rate of the polymer 6 at 380° C. was 25 mm$^3$/sec, the composition was such that TFE/CF$_2$=CF-O-(CF$_2$)$_3$F/himic anhydride=97.9/2/0.1 mol %, the melting point was 300° C., and the interlayer adhesion between the fluorinated polymer and a copper foil was 32 N/cm, and the interlayer adhesion between the fluorinated polymer and a polyamide resin was 30 N/cm.

Comparative Example 1

Polymerization was carried out in the same manner as in Example 1 except that a $CF_3CH_2OCF_2CF_2H$ solution containing 1.8 mass % of itaconic anhydride, in the same amount as intermittently added during polymerization in Example 1, was added all at once at the initial stage of the polymerization, whereby a polymer 5 was obtained.

The volume flow rate of the polymer 5 at 297° C. was 18 mm$^3$/sec, the composition was such that TFE/E/CH$_2$=CH$(CF_2)_2$F/itaconic anhydride=55.1/42.4/2.1/0.4 mol %, the melting point was 241° C., and the interlayer adhesion between the fluorinated polymer and polyamide was less than 1 N/cm.

Comparative Example 2

A stainless steel polymerization tank provided with a stirrer and a jacket, having an internal capacity of 1.3 L (liter), was evacuated of air, then charged with 767 g of $CF_3(CF_2)_4CF_2H$, 130 g of 1,3-dichloro-1,1,2,2,3-pentafluoropropane and 3.2 g of CH$_2$=CH(CF$_2$)$_4$F, and then charged with 375 g of HFP, 107 g of TFE and 3.3 g of E while stirring the interior of the polymerization tank, followed by letting warm water flow into the jacket so that the internal temperature of the polymerization tank would be 66° C. The internal pressure of the polymerization tank was 1.50 MPaG at that time. After the internal temperature became stable, 7.4 mL of a $CF_3(CF_2)_4CF_2H$ solution containing 5 mass % of tert-butylperoxy pivalate was injected to initiate the polymerization. During the polymerization, a mixed gas having a molar ratio of TFE/E=54/46 was added so that the internal pressure would be constant at 1.50 MPaG.

In addition, 3.4 mL of a $CF_3(CF_2)_4CF_2H$ solution containing 3.7 mass % of CH$_2$=CH(CF$_2$)$_4$F and 0.7 mass % of itaconic anhydride was added every time when 5 g of the TFE/E mixed gas added during the polymerization was consumed. At that time, the solubility of itaconic anhydride in $CF_3(CF_2)_4CF_2H$ at 25° C. was so low as 0.2 mass %, and therefore $CF_3(CF_2)_4CF_2H$ was first heated to 66° C. so as to increase the concentration of dissolved itaconic anhydride, whereby the $CF_3(CF_2)_4CF_2H$ solution containing 3.7 mass % of CH$_2$=CH(CF$_2$)$_4$F and 0.7 mass % of itaconic anhydride was obtained. Then the $CF_3(CF_2)_4CF_2H$ solution containing itaconic anhydride and CH$_2$=CH(CF$_2$)$_4$F was added to the polymerization tank while heated to 66° C., as is different from Examples 1 to 4 where the solution having itaconic anhydride dissolved was added at a normal temperature.

After 220 minutes from the initiation of the reaction and addition of 70 g of the mixed gas having a molar ratio of TFE/E=54/46, the polymerization tank was cooled to complete the polymerization.

Thereafter, the remaining monomer gas was purged from the polymerization tank until the pressure would be atmospheric pressure, the resulting slurry was transferred to a container having an internal capacity of 2 L, water in the same volume as the slurry was added, followed by heating (between 20 and 73° C.), whereby a polymer was separated from the polymerization medium, the chain transfer agent and the remaining monomer. The resulting polymer was dried in an oven at 120° C. to obtain a white powdery polymer 6.

The volume flow rate of the polymer 6 at 220° C. was 26 mm³/sec, the composition was such that TFE/E/HFP/CH$_2$=CH(CF$_2$)$_4$F/itaconic anhydride=48.0/42.9/7.9/0.9/0.3 mol %, the melting point was 176° C., and the interlayer adhesion between the fluorinated polymer and polyamide was 5 N/cm.

The type of the polymerization medium and the monomer, the method for supplying the polar functional group-containing monomer, and interlayer adhesion, used in Examples 1 to 4 and Comparative Examples 1 and 2, are shown in the following Table 1.

The type of the polymerization medium and the monomer, the method for supplying the polar functional group-containing monomer and interlayer adhesion, used in Example 5, are shown in the following Table 2.

medium different from the present invention was intermittently added to a polymerization reaction system.

On the other hand, in Examples 1 to 3 where a solution obtained by dissolving itaconic anhydride in CF$_3$CH$_2$OCF$_2$CF$_2$H as a polymerization medium was intermittently added to a polymerization reaction system, the adhesion strength of the fluorinated polymer was high as compared with Comparative Examples 1 and 2.

Further, in Example 4 where a solution obtained by dissolving itaconic anhydride in CF$_3$CH$_2$OCF$_2$CF$_2$H and CF$_3$(CF$_2$)$_4$CF$_2$H as the polymerization medium of the present invention was intermittently added to a polymerization reaction system, the adhesion strength of the fluorinated polymer was high as compared with Comparative Examples 1 and 2.

TABLE 1

| | Ex. 1 | Ex. 2 | Ex. 3 | Ex. 4 | Comp. Ex. 1 | Comp. Ex. 2 |
|---|---|---|---|---|---|---|
| Polymerization medium | CF$_3$CH$_2$O(CF$_2$)$_2$H | CF$_3$CH$_2$O(CF$_2$)$_2$H | CF$_3$CH$_2$O(CF$_2$)$_2$H | CF$_3$CH$_2$OCF$_2$CF$_2$H CF$_3$(CF$_2$)$_4$CF$_2$H | CF$_3$CH$_2$O(CF$_2$)$_2$H | CF$_3$(CF$_2$)$_4$CF$_2$H |
| Fluorinated monomer | TFE CH$_2$=CH(CF$_2$)$_2$F | TFE CH$_2$=CH(CF$_2$)$_2$F | TFE HFP CH$_2$=CH(CF$_2$)$_4$F | TFE CH$_2$=CH(CF$_2$)$_2$F | TFE CH$_2$=CH(CF$_2$)$_2$F | TFE HFP CH$_2$=CH(CF$_2$)$_4$F |
| Polar functional group-containing monomer | Itaconic anhydride | Itaconic anhydride | Itaconic anhydride | Itaconic anhydride | Itaconic anhydride | Itaconic anhydride |
| Another monomer | E | E | E | E | E | E |
| Method for charging solution obtained by dissolving polar functional group-containing monomer in polymerization medium | Intermittently added to polymerization reaction system | Intermittently added to polymerization reaction system | Intermittently added to polymerization reaction system | Intermittently added to polymerization reaction systemn | Charged all at once into polymerization tank at an initial stage of reaction | Intermittently added to polymerization reaction system |
| Interlayer adhesion between fluorinated polymer and polyamide (N/cm) | 19 | 22 | 12 | 18 | 1 | 5 |

TABLE 2

| | Ex. 5 |
|---|---|
| Polymerization medium | CF$_3$CH$_2$OCF$_2$CF$_2$H |
| Fluorinated monomer | TFE CF$_2$=CFO(CF$_2$)$_3$F |
| Polar functional group-containing monomer | Himic anhydride |
| Another monomer | — |
| Method for charging solution obtained by dissolving polar functional group-containing monomer in polymerization medium | Intermittently added to polymerization reaction system |
| Interlayer adhesion between fluorinated polymer and copper foil (N/cm) | 32 |
| Interlayer adhesion between fluorinated polymer and polyimide resin (N/cm) | 30 |

According to the above result, it is found that adhesion strength of the fluorinated polymer was only 1 N/cm in Comparative Example 1 where a solution obtained by dissolving itaconic anhydride in CF$_3$CH$_2$OCF$_2$CF$_2$H as the polymerization medium of the present invention was charged all at once into a polymerization tank at the initial stage of the reaction. Further, the adhesion strength of the fluorinated polymer was only 5 N/cm in Comparative Example 2 where a solution obtained by dissolving itaconic anhydride in CF$_3$(CF$_2$)$_4$CF$_2$H which is a polymerization

INDUSTRIAL APPLICABILITY

The fluorinated polymer obtained by the process for producing a fluorinated polymer of the present invention can easily adhere to other materials thereby to form a laminate or a composite material.

This application is a continuation of PCT Application No. PCT/JP2015/065399, filed on May 28, 2015, which is based upon and claims the benefit of priority from Japanese Patent Application No. 2014-112770 filed on May 30, 2014. The contents of those applications are incorporated herein by reference in their entireties.

What is claimed is:

1. A process for producing a fluorinated polymer, the process comprising:
   polymerizing a monomer mixture comprising a fluorinated monomer and a polar functional group-containing monomer, excluding one having a fluorine atom, in a polymerization medium,
      wherein the polymerization medium contains a medium compound represented by the following formula (1), and
      wherein a solution obtained by dissolving the polar functional group-containing monomer in the polymerization medium is continuously or intermittently added to a polymerization reaction system:

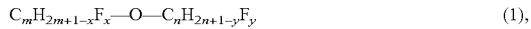  (1), wherein m is an integer of from 1 to 6, n is an integer of from 1 to 6, x is from 0 to (2m+1), y is from 0 to 2n, and (x+y) is at least 1.

2. The process for producing a fluorinated polymer according to claim 1, wherein the concentration of the medium compound in the polymerization medium is at least 50 vol %.

3. The process for producing a fluorinated polymer according to claim 1, wherein the solubility of the polar functional group-containing monomer in the polymerization medium at 25° C. is at least 1 mass %.

4. The process for producing a fluorinated polymer according to claim 1, wherein the concentration of the polar functional group-containing monomer in the solution is from 1.3 to 5.0 mass % when the solution obtained by dissolving the polar functional group-containing monomer in the polymerization medium is continuously or intermittently added to the polymerization reaction system.

5. The process for producing a fluorinated polymer according to claim 1, wherein the polymerization is carried out in the presence of a chain transfer agent which is at least one member selected from the group consisting of an alcohol, a hydrocarbon, a hydrofluorocarbon, a ketone, a mercaptan, an ester and an ether.

6. The process for producing a fluorinated polymer according to claim 5, wherein the chain transfer agent has water-solubility, and wherein a slurry obtained by polymerizing the monomer mixture in the polymerization medium is mixed with water so as to dissolve the chain transfer agent in water, followed by recovering the fluorinated polymer and the polymerization medium.

7. The process for producing a fluorinated polymer according to claim 6, wherein the polymerization medium recovered is recycled as a polymerization medium to be used for polymerizing the monomer mixture.

8. The process for producing a fluorinated polymer according to claim 1, wherein the monomer mixture contains tetrafluoroethylene as the fluorinated monomer, and further contains ethylene as another monomer.

9. The process for producing a fluorinated polymer according to claim 1, wherein the polar functional group in the polar functional group-containing monomer is at least one member selected from the group consisting of a hydroxy group, a carboxy group, an epoxy group and an acid anhydride residue.

10. The process for producing a fluorinated polymer according to claim 9, wherein the polar functional group is an acid anhydride residue.

* * * * *